United States Patent
Schindzielorz et al.

(10) Patent No.: US 7,276,275 B2
(45) Date of Patent: Oct. 2, 2007

(54) LAMINATED SPACER FABRIC

(75) Inventors: Michael Schindzielorz, Kernersville, SC (US); Jimmy Pruitt, Hickory, NC (US); Carl Wagner, Cheraw, SC (US)

(73) Assignee: Highland Industries, Inc., Kernersville, NC (US)

( * ) Notice: Subject to any disclaimer, the term of this patent is extended or adjusted under 35 U.S.C. 154(b) by 271 days.

(21) Appl. No.: 10/829,397

(22) Filed: Apr. 22, 2004

(65) Prior Publication Data
US 2005/0238842 A1    Oct. 27, 2005

(51) Int. Cl.
*B32B 3/10* (2006.01)
*B32B 3/18* (2006.01)
*B32B 5/22* (2006.01)
*B32B 5/26* (2006.01)
*B32B 5/32* (2006.01)

(52) U.S. Cl. ............ 428/86; 442/1; 442/318; 428/212

(58) Field of Classification Search ............ 428/86, 428/131, 137, 212, 119; 442/1, 318; 297/452.42, 297/452.48
See application file for complete search history.

(56) References Cited

U.S. PATENT DOCUMENTS

| | | | |
|---|---|---|---|
| 2,792,320 A | 5/1957 | Bower | |
| 4,504,536 A | 3/1985 | Wong | |
| 4,798,756 A | 1/1989 | Fukushima et al. | |
| 4,833,016 A | 5/1989 | Segawa et al. | |
| 5,385,036 A | 1/1995 | Spillane et al. | |
| 5,422,153 A | 6/1995 | Miyamoto | |
| 5,456,976 A | 10/1995 | LaMarca, II et al. | |
| 5,589,245 A | 12/1996 | Roell | |
| 5,651,847 A * | 7/1997 | Loeffler | 66/19 |
| 5,783,277 A | 7/1998 | Rock et al. | |
| 5,817,391 A | 10/1998 | Rock et al. | |
| 5,896,758 A | 4/1999 | Rock et al. | |
| 5,902,014 A | 5/1999 | Dinkel et al. | |
| 6,064,037 A * | 5/2000 | Weiss et al. | 219/217 |
| 6,103,641 A * | 8/2000 | Gehring, Jr. | 442/46 |
| 6,116,059 A * | 9/2000 | Rock et al. | 66/191 |
| 6,156,406 A | 12/2000 | Rock et al. | |
| 6,231,940 B1 | 5/2001 | Aichner et al. | |
| 6,627,562 B1 * | 9/2003 | Gehring, Jr. | 442/35 |
| 6,629,724 B2 * | 10/2003 | Ekern et al. | 297/180.11 |
| 6,840,576 B2 * | 1/2005 | Ekern et al. | 297/180.14 |
| 2002/0114782 A1 | 8/2002 | Wolfe et al. | |
| 2002/0140258 A1* | 10/2002 | Ekern et al. | 297/180.14 |
| 2003/0021946 A1 | 1/2003 | Mecsch, III et al. | |
| 2004/0062903 A1 | 4/2004 | Evans, Jr. et al. | |
| 2004/0097151 A1* | 5/2004 | McMurray | 442/304 |
| 2005/0112975 A1* | 5/2005 | McMurray | 442/306 |

FOREIGN PATENT DOCUMENTS

| | | |
|---|---|---|
| DE | 196 28 698 C1 | 10/1997 |
| DE | 197 36 951 A1 | 3/1999 |
| DE | 199 31 193 A1 | 1/2001 |

* cited by examiner

*Primary Examiner*—Cheryl A Juska
(74) *Attorney, Agent, or Firm*—Foley & Lardner LLP

(57) ABSTRACT

A laminated material including a decorative or functional cover layer laminated to a porous material layer. The cover layer may include a rigid, semi-rigid or flexible material and the porous spacer material layer may include a reticulated foam, nonwoven textile, or a spacer fabric. The cover layer is laminated onto the porous material layer, increasing the seam strength, durability and dimensional stability of the material.

3 Claims, 3 Drawing Sheets

LAMINATED SPACER FABRIC

BACKGROUND OF THE INVENTION

The present invention relates to a laminated spacer fabric.

Certain conventional fabrics include a padding or porous layer covered by an outer layer. The underlying padding or porous layer is typically sewn to the outer layer. The outer layer in the conventional sewn assembly may pucker or have other surface deformations resulting from the sewn seams. Additionally, in certain situations, pockets or gaps may be formed between the padding and outer layers. These problems create an undesirable appearance and may decrease the value of a seat or the object utilizing the sewn fabric. The puckering and air pockets may also create an uncomfortable surface when contacted by a person sitting or leaning against the sewn fabric.

The porous or padding layer may be a spacer fabric. The conventional covered spacer fabrics generally result in increased costs for the manufacturer. Rolls or cut pieces of the spacer fabric are produced, pre-cut, and shipped to an assembly plant. After shipment, the spacer fabric tends to lose its dimensions. As a result, the process of sewing a precut outer layer to the spacer fabric is difficult and time-consuming. Another drawback of the conventional spacer fabric is that the edges of the conventional fabric fray and lack dimensional stability.

These covered spacer fabrics have many uses such as, for example, seats, home furnishings, and shoes. Conventional spacer fabrics incorporated in seats may be found, for example, in DE 19931193 (hereby incorporated by reference herein in its entirety).

The spacer fabric is typically a padding or ventilation layer. Seats generally use spacer fabrics to cool or warm an occupant or remove perspiration. However, typical seats in spacer fabrics wear quickly and may chill or overheat an occupant due to improper air flow.

Spacer fabrics offer several advantages over other padding or ventilation layers such as, for example, foam. First, spacer fabrics are formed from textile fibers and filaments and many textile fiber and filamentary materials are recyclable. Thus, the use of spacer fabrics as a cushioning material overcomes the inability of foams to be recycled and the attendant problems associated with disposal of such materials. Also, spacer fabrics offer substantially enhanced air and moisture permeability over foams, which make such fabrics more desirable than foam materials for use in automotive and marine applications as well as home furnishing applications.

As described above, current textile technology includes spacer fabric materials with sewn on material coverings. Spacer fabrics covered with a sewn on material characteristically have the tendency for the opposing covering and spacer structures to shift and move in parallel with respect to one another. Moreover, there are inherent difficulties in mating a rigid or semi-rigid surface material (e.g. leather) with a non-rigid spacer material through a sewing process. One problem is that the dimensions of the cut pieces of spacer material tend to change size after cutting, typically shrinking in size. As a result, when the cut part of rigid or semi-rigid material is sewn around the perimeter to the cut piece of spacer fabric, the change in dimensions of the spacer material cause puckering and creasing in the rigid or semi-rigid cover layer. A large number of the sewn components have this problem. Present attempts to solve this specific problem have focused on using a more rigid, higher denier monofilament in the spacer fabric to improve the sewing performance and have not been successful. The use of a significantly heavier denier monofilament produces an uncomfortable fabric.

Other problems encountered in joining cut pieces of spacer fabric to cut pieces of a cover material include rough, jagged edges; fraying and shedding of monofilament pile; missing or misplaced notches (to guide the sewer); during sewing, the sewing needle and presser foot snag in the spacer fabric; and sewing "run off" or "raw edge" where the stitches of the joining seam do not grip the spacer fabric. The primary causes of these problems are inconsistent part dimensionality, inherent elasticity of the fabric, and jostling during transit.

SUMMARY OF THE INVENTION

A laminated material, according to an embodiment of the invention includes a cover layer and a spacer fabric. The spacer fabric comprises a first and second fabric layer, and a pile layer. The cover layer is laminated onto the spacer fabric.

A seat, according to another embodiment of the invention, includes a cover layer, and a porous material. The porous material is positioned under the cover layer and the cover layer is laminated on the porous material.

A material, according to another embodiment of the present invention, includes a spacer fabric covered by a cover layer. The cover layer is laminated to the spacer fabric so that the top surface of the fabric is substantially smooth.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Hereinafter, embodiments of the present invention will be described with reference to the attached drawings.

Figure 5:
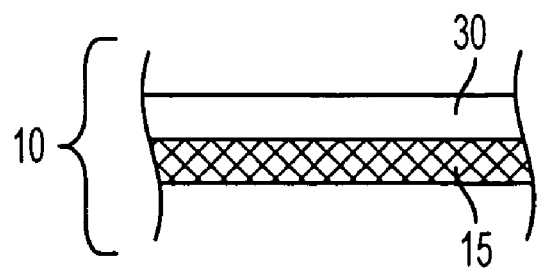
FIG. 5 is a sectional view of the laminated material according to an embodiment of the present invention.

According to an embodiment of the present invention, a laminated material 10 is provided. As shown in FIG. 5, the laminated material 10, may include a cover layer 30 and a porous material layer 15. The cover layer 30 may be porous and may include a poly-vinyl chloride polymer coated material, leather, body cloth fabric, a thermoplastic olefin coated material, a polyurethane coated material, or any other suitable material. The porous material layer 15 may be a reticulated foam, a nonwoven textile, or preferably a spacer fabric.

Figure 1:
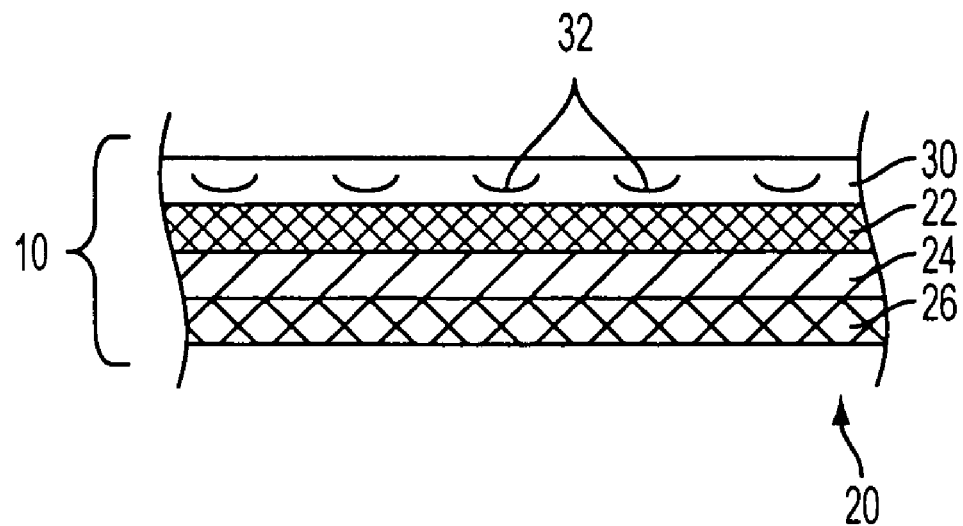
FIG. 1 is a sectional view of a laminated material according to an embodiment of the present invention.
Figure 2:
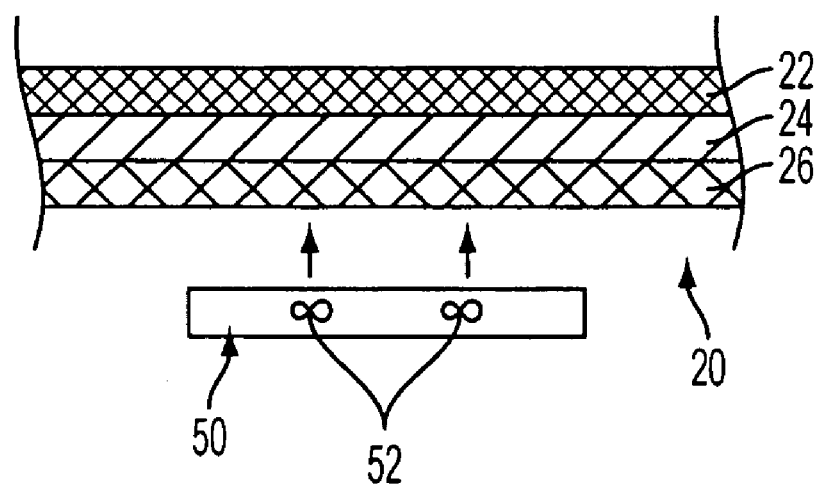
FIG. 2 is a sectional view of a porous material according to an embodiment of the present invention.
Figure 3:
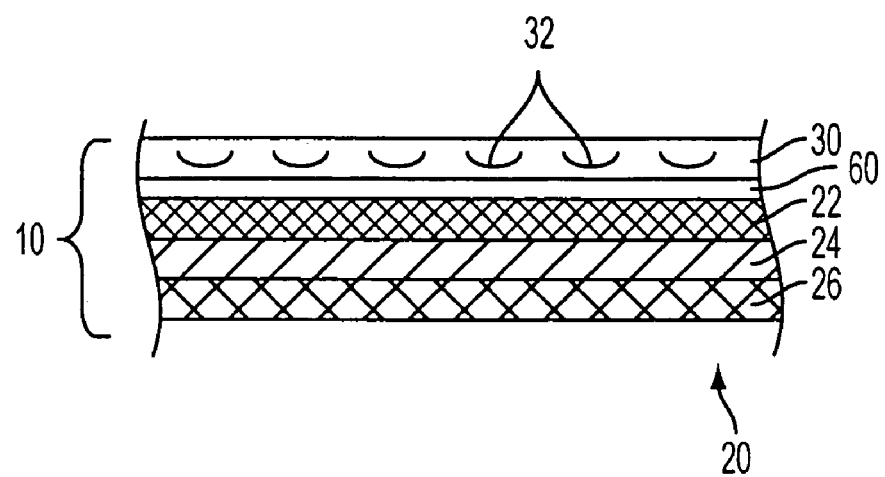
FIG. 3 is a sectional view of the laminated material according to FIG. 1.

According to an alternative embodiment of the present invention, the porous material layer 15 may comprise a spacer fabric 20. The spacer fabric 20, as shown in FIGS. 1 and 2, may include a first fabric layer 22, a second fabric layer 26 and a pile layer 24 which connects the first 22 and second 26 fabric layers. The fabric layers 22, 26 are made of a knitted material. The pile layer 26 is composed of 100% by weight of monofilament yarn. The spacer fabric layer 20 may be produced on a multi-guide bar, double needle bar, Raschel type knitting machine, or by any other suitable loom or knitting machine.

The spacer fabric layer 20 is configured to allow air to flow through the material and remove or evaporate moisture from an outer surface. The cover layer 30 is attached to the first fabric layer 22. The cover layer 30 may be a continuous material and include perforations 32 which allow for fluid (i.e. air, moisture and/or climate controlled forced air) to flow through the layer. The perforations shown 32 in the drawings are exemplary only and may be in different locations or sizes.

The spacer fabric 20 may be approximately 4 to 60 mm in thickness. According to another embodiment of the invention, the thickness of the spacer fabric may be 6 to 30 mm. Preferably, the thickness of the spacer fabric 20 is about 8 to about 12 mm. The denier of the pile yarn may be approximately 30 to 1200 denier. According to another embodiment of the invention, the denier of the pile yarn may be 100 to 900. Preferably, the denier of the pile yarn is about 150 to about 600.

The first fabric layer 22 of the spacer fabric 20 may be of any configuration, but is preferably a close-knit arrangement. The second fabric layer 26 is preferably a open mesh, honeycomb surface structure, but may be configured to be any suitable structure. The denier of the yarn in the first and second fabric layers may be 40 to 1200. According to another embodiment of the invention, the denier of the yarn in the first and second fabric layers may be 100 to 900. Preferably, the denier of the yarn in the first and second fabric layers is about 150 to about 600. The denier of the yarn in the first layer may differ from the denier of the yarn in the second layer.

The spacer fabric 20 is an air permeable fabric. The spacer fabric 20 may also increase the cushioning feel to an occupant or user of the fabric and may repel and/or absorb moisture on one or both sides of the fabric 20. The spacer fabric 20 may be configured so the first fabric layer 22 has an air permeability different from the air permeability of the second fabric layer 26.

Figure 6:
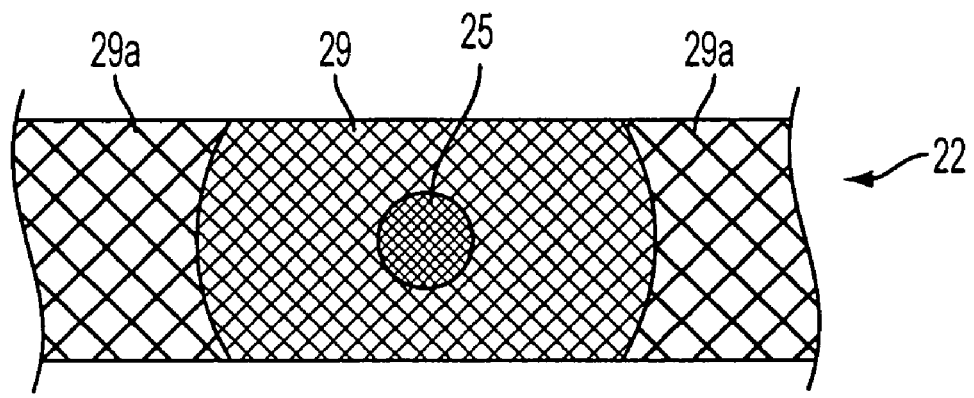
FIG. 6 is a top-side view of the spacer fabric according to another embodiment of the present invention.
Figure 7:
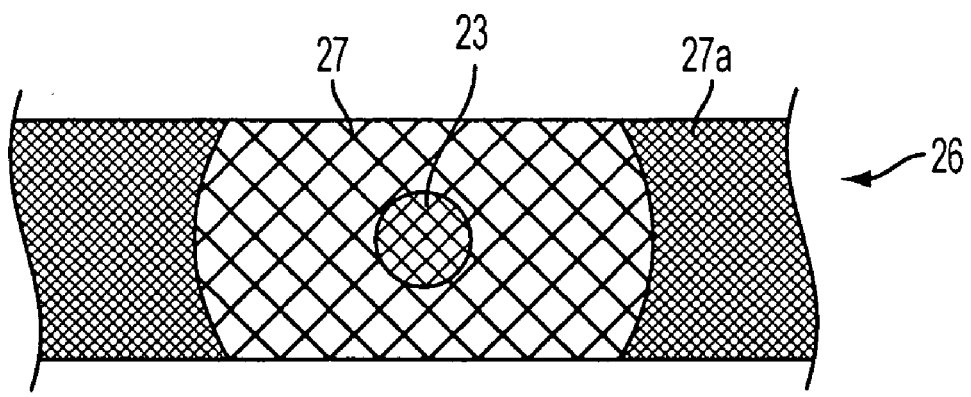
FIG. 7 is an underside view of the spacer fabric according to FIG. 6.

According to an embodiment of the present invention, the second fabric layer 26 includes a first portion 23 for air supply or air removal which is made with the greatest possible air permeability (shown in FIG. 7). The first fabric layer 22 may include a second portion 25 that is made with reduced air permeability, as shown in FIG. 6. The second portion 25 is aligned opposite the first portion 23. According to an embodiment of the invention, both the first 23 and second 25 portions are generally circular. The second portion 25 is adjoined by a third portion 29 which has increased air permeability as the distance increases from the second portion 23. The third portion 29 and adjacent portions 29a are generally annular and continue to increase in air permeability the farther from the second portion 23. As shown in FIG. 7, the second fabric layer 26 may include a fourth portion 27 that decreases in air permeability and is generally an annular shape around the first portion 23. The fourth portion 27 and adjacent portions 27a decrease in air permeability the farther from the first portion 23. The portions 23, 25, 27, 29 may be defined by cut edges. The different air permeabilities allow air flow to pass through the second fabric layer 26, at or near the first portion 23 and pass through the pile 24 and first fabric layer 22 with approximately uniform distribution of the air flow. Of course, as will be recognized by those skilled in the art, the air flow direction may be reversed and/or the location of the portions 23, 25, 27, 29 may be switched in order to have equal flow distribution with a change in direction of flow. The first 23 and second portions 25 may also be any other configuration or shape suitable for air circulation such as, for example, rectangular. As will be appreciated by those skilled in the art, any suitable type of spacer fabric may be used.

According to an embodiment of the invention, the second fabric layer 26 is configured to be adjacent an air circulation system 50, as shown in FIG. 2. The air circulation system 50 is not part of the spacer fabric 20, but is a separate system. The air flow system 50 may comprise electric fans 52, such as, for example, the system found in U.S. Pat. No. 5,626,021 or RE 38,128 (both patents are hereby incorporated by reference herein in their entirety). Of course, any other suitable air circulation system 50 may be used. The air flow system 50 may cool or heat the fabric 20 or the object attached to the fabric 20, such as a seat, bed, backpack, or any other suitable object. The air flow system 50 may force air through the fabric and blow the air through the second fabric layer 26, distributed through the pile layer 24 and out and through the first fabric layer 22.

As mentioned above, the porous material 15, may comprise a reticulated foam or a nonwoven textile. The cover layer 30 attaches to one side of the porous material 15'. The cover layer 30 is attached to a side of the porous material layer 15 by lamination. The cover layer 30 may be laminated onto the porous material layer 15 by any suitable method such as, for example, thermoplastic laminates, thermoset processes, cold laminating, or a UV curable adhesion system.

Preferably, in the case of the porous material layer 15 comprising a spacer fabric 20, the cover layer 30 is attached to the first fabric layer 22 on a side adjacent to the pile layer 24. A laminate 60 is applied to and coated on an underside of the cover layer fabric 30 which is then positioned on the first fabric layer 22. The laminated material 10 may then be held under weight for approximately twenty-four hours to properly seal the cover layer 30 to the first fabric layer 22 and, thus, the spacer fabric 20. The same basic process may be employed for laminating the cover layer 30 to other embodiments of the porous material layer 15.

According to an embodiment of the invention, the laminate 60 may be formed by the use of a solvent born, flame retardant polyurethane adhesive, or any other suitable adhesive. According to one embodiment of the present invention, the laminate 60 may be applied to the cover layer 30 by hot melt spun adhesive or by spraying the adhesion onto the underside of the cover layer 30 by a spray nozzle or oscillating disk. The spray nozzle or oscillating disk passes along the length of the material to coat the cover layer 30 and then the cover layer 30 is pressed onto the porous material layer 15. Before a laminate 60 is applied to the cover layer 30, the cover layer 30 and porous material layer 15 is heat set at approximately 400 degrees Fahrenheit.

After the lamination process, according to another embodiment of the present invention, the cover layer 30 may be further secured to the porous material layer 15 by a variety of different welding processes, i.e., a radio frequency (RF) welding process, thermal heat sealing, ultrasound and dielectric sealing. For example, the materials can be RF welded along the perimeter of the material 10. The RF weld may be applied with utilizing a die. The laminated material 10 may also be sewn along the perimeter after the cover layer 30 is laminated to the porous material layer 15.

The laminated material 10 effectively simulates the compressibility and resiliency of conventional spacer fabric and plastic foam materials such as polyurethane. In addition, the laminated material 10 provides wear reduction, improved seam strength, reduced edge fraying and ease of production.

The laminated material 10 has improved wear characteristics. The cover layer 30 has less mobility in comparison to the porous material layer 15. In other words, according to the present invention, there is less relative movement between the cover layer 30 and the porous material layer 15. The cover layer 30 does not slide relative to the adjoining porous material layer 15. Accordingly, the life of the fabric 10 is increased. Furthermore, the seam strength of the fabric 10, as may be tested by a needle pullout test, is increased due to the lamination of the cover layer 30 to the porous material layer 20.

Figure 4:
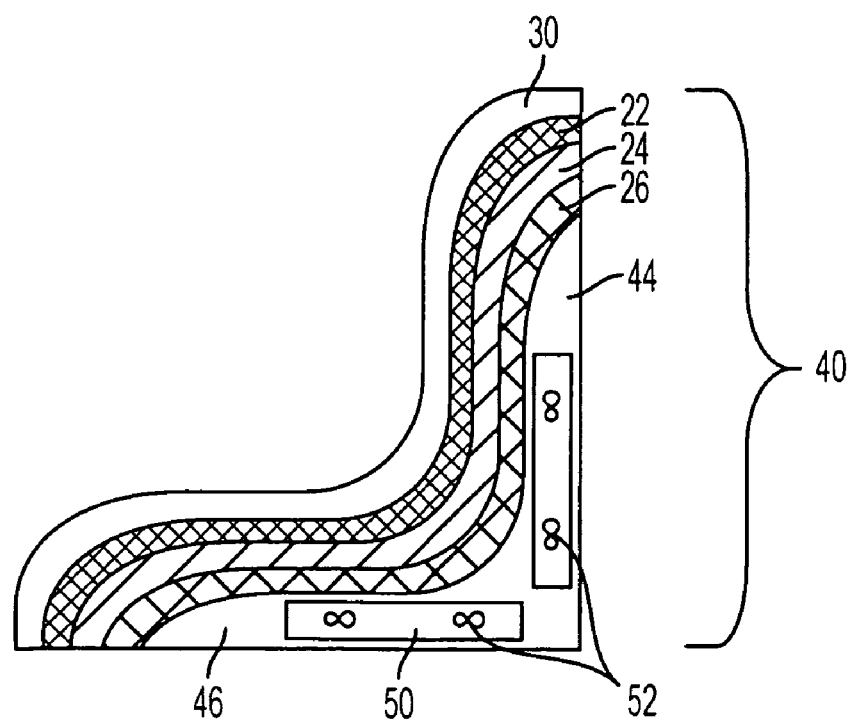
FIG. 4 is a sectional view of a seat according to an embodiment of the present invention.

According to another embodiment of the invention, as shown in FIG. 4, a seat 40 for an automobile, watercraft, or any other type of seat 40 is provided. The seat 40 may include a seat back 44 and/or a seat bottom 46. The seat 40 includes a cover layer 30 which is integrated onto a surface of the seat back 44 and/or seat bottom 46 adjacent to an occupant (not shown). A porous material is positioned adjacent to the cover layer 30 on a side of the cover layer 30 opposite the occupant. The porous material may be a reticulated foam, a nonwoven textile, or a spacer fabric and is laminated onto the cover layer 30. According to FIG. 4, a spacer fabric 20 is shown. The spacer fabric 20 is similar to that described above and includes a first fabric layer 22, a second fabric layer 26 and a pile layer 24. The use of the laminated material including a cover layer overlying a porous material layer for the seat covering allows for air flow and/or removal or evaporation of moisture from the exposed surface of the seat bottom and back adjacent to an occupant.

The seat 40, according to an embodiment of the invention, may further include an air circulation flow device 50. The air flow device 50 may include fans 52. The fans 52 are shown in FIG. 4 in exemplary locations only and may be positioned in various, suitable locations. The air flow device 50 may be the Amerigon climate control system, for example the system disclosed in U.S. Pat. No. 5,626,021 or RE 38,128, or any other suitable air flow/removal system.

It is to be understood that any suitable spacer fabric may be used as the porous material in the laminated material 10 and the seat 40. In addition, different combinations of cover layers 30 and ventilated materials 20 may be used for the laminated material and seat.

Given the disclosure of the present invention, one versed in the art would appreciate that there may be other embodiments and modifications within the scope and spirit of the invention. For example, the scope of the present invention includes a laminated material structure having multiple layers of porous material. For example, the laminated material may include one or more layers of reticulated foam in combination with one or more layers of spacer material. Other suitable combinations of porous material layers would also fall within the scope of the present invention. Furthermore, all modifications attainable by one versed in the art from the present disclosure within the scope and spirit of the present invention are to be included as further embodiments of the present invention. The scope of the present invention is to be defined as set forth in the following claims.

What is claimed is:

1. A laminated material comprising:
    a cover layer; and
    a spacer fabric, the spacer fabric comprising:
        a first fabric layer;
        a pile layer; and
        a second fabric layer,
    wherein the cover layer is laminated directly onto the spacer fabric, and
    wherein the air permeability of a first portion of the second fabric layer is greater than the air permeability of the remainder of the second fabric layer.

2. The laminated material of claim 1, wherein the first fabric layer includes a second portion aligned opposite the first portion of the second fabric layer; wherein the air permeability of the second portion of the first fabric layer is less than the air permeability of the remainder of the first fabric layer.

3. The laminated material of claim 2, wherein the first fabric layer includes a third portion adjoining the second portion; and wherein the air permeability of the third portion increases with increasing distance from the second portion.

* * * * *